US008099482B2

(12) United States Patent
Clark et al.

(10) Patent No.: US 8,099,482 B2
(45) Date of Patent: Jan. 17, 2012

(54) PRIORITIZED CONTENT DOWNLOAD FOR AN ENTERTAINMENT DEVICE

(75) Inventors: Darren L. Clark, Concord, CA (US); Howard L. Spielman, San Francisco, CA (US)

(73) Assignee: e-cast Inc., San Francisco, CA (US)

( * ) Notice: Subject to any disclaimer, the term of this patent is extended or adjusted under 35 U.S.C. 154(b) by 1518 days.

(21) Appl. No.: 10/956,823

(22) Filed: Oct. 1, 2004

(65) Prior Publication Data
US 2006/0074750 A1 Apr. 6, 2006

(51) Int. Cl.
*G06F 13/00* (2006.01)

(52) U.S. Cl. ........ 709/223; 709/207; 709/232; 717/178; 717/177; 717/176; 718/103

(58) Field of Classification Search .................. 709/223, 709/224, 207, 231, 232; 717/171–173, 176–178; 718/102–104
See application file for complete search history.

(56) References Cited

U.S. PATENT DOCUMENTS

| | | |
|---|---|---|
| 3,718,906 A | 2/1973 | Lightner |
| 3,964,025 A | 6/1976 | Oosterhouse |
| 3,985,217 A | 10/1976 | Kortenhaus et al. |
| 4,045,776 A | 8/1977 | Wheelwright et al. |
| 4,232,295 A | 11/1980 | McConnell |
| 4,335,809 A | 6/1982 | Wain |
| 4,359,631 A | 11/1982 | Lockwood et al. |
| 4,412,292 A | 10/1983 | Sedam et al. |
| 4,521,014 A | 6/1985 | Sitrick |
| 4,528,643 A | 7/1985 | Freeny, Jr. |
| 4,572,509 A | 2/1986 | Sitrick |
| 4,582,324 A | 4/1986 | Koza et al. |
| 4,636,951 A | 1/1987 | Harlick |
| 4,652,998 A | 3/1987 | Koza et al. |
| 4,654,799 A | 3/1987 | Ogaki et al. |
| 4,658,093 A | 4/1987 | Hellman |
| 4,667,802 A | 5/1987 | Verduin et al. |
| 4,761,684 A | 8/1988 | Clark et al. |
| 4,766,581 A | 8/1988 | Korn et al. |
| 4,811,325 A | 3/1989 | Sharples, Jr. et al. |

(Continued)

FOREIGN PATENT DOCUMENTS

EP 0843272 5/1998
(Continued)

OTHER PUBLICATIONS

Tatsuya et al., Music Server System: Distributed Music System on Local Area Network, Journal of Information Processing, Abstract, vol. 15, No. 01-001, Jun. 19, 2001.

(Continued)

*Primary Examiner* — Kenneth R Coulter
(74) *Attorney, Agent, or Firm* — Van Pelt, Yi & James LLP

(57) ABSTRACT

Priority-based content retrieval mechanisms for digital entertainment devices are provided. In various embodiments, the download prioritizations may be interrupt-based, sequence-based, or a combination of the two. In interrupt-based prioritizations, a higher priority download request will interrupt a lower-priority download that is already in progress. In sequence-based prioritizations, a plurality of file download requests may be ordered in a download queue depending on the priority of the request, with higher priority requests being positioned towards the top of the queue and lower priority requests being positioned towards the bottom of the queue.

15 Claims, 5 Drawing Sheets

U.S. PATENT DOCUMENTS

| | | |
|---|---|---|
| 4,817,043 A | 3/1989 | Brown |
| 4,920,432 A | 4/1990 | Eggers et al. |
| 4,922,420 A | 5/1990 | Nakagawa et al. |
| 4,937,807 A | 6/1990 | Weitz et al. |
| 4,949,187 A | 8/1990 | Cohen |
| 4,956,768 A | 9/1990 | Sidi et al. |
| 4,958,835 A | 9/1990 | Tashiro et al. |
| 5,041,921 A | 8/1991 | Scheffler |
| 5,057,915 A | 10/1991 | Von Kohorn |
| 5,191,573 A | 3/1993 | Hair |
| 5,191,611 A | 3/1993 | Lang |
| 5,191,615 A | 3/1993 | Aldava et al. |
| 5,204,947 A | 4/1993 | Bernstein et al. |
| 5,255,358 A | 10/1993 | Busboom et al. |
| 5,278,909 A | 1/1994 | Edgar |
| 5,341,350 A | 8/1994 | Frank et al. |
| 5,353,400 A | 10/1994 | Nigawara et al. |
| 5,355,302 A | 10/1994 | Martin et al. |
| 5,365,381 A | 11/1994 | Scheffler |
| 5,384,910 A | 1/1995 | Torres |
| 5,388,181 A | 2/1995 | Anderson et al. |
| 5,404,528 A | 4/1995 | Mahajan |
| 5,440,644 A | 8/1995 | Farinelli et al. |
| 5,445,295 A | 8/1995 | Brown |
| 5,491,820 A | 2/1996 | Belove et al. |
| 5,497,502 A | 3/1996 | Castille |
| 5,539,735 A | 7/1996 | Moskowitz |
| 5,541,638 A | 7/1996 | Story |
| 5,541,917 A | 7/1996 | Farris |
| 5,557,658 A | 9/1996 | Gregorek et al. |
| 5,588,147 A | 12/1996 | Neeman et al. |
| 5,668,788 A | 9/1997 | Allison |
| 5,678,012 A | 10/1997 | Kimmich et al. |
| 5,691,964 A | 11/1997 | Niederlein et al. |
| 5,696,906 A | 12/1997 | Peters et al. |
| 5,726,909 A | 3/1998 | Krikorian |
| 5,751,672 A | 5/1998 | Yankowski |
| 5,761,071 A | 6/1998 | Bernstein et al. |
| 5,774,652 A | 6/1998 | Smith |
| 5,781,889 A | 7/1998 | Martin et al. |
| 5,805,804 A | 9/1998 | Laursen et al. |
| 5,835,843 A | 11/1998 | Haddad et al. |
| 5,848,398 A | 12/1998 | Martin et al. |
| 5,861,906 A | 1/1999 | Dunn et al. |
| 5,884,284 A | 3/1999 | Peters et al. |
| 5,899,699 A | 5/1999 | Kamiya |
| 5,918,213 A | 6/1999 | Bernard et al. |
| 5,924,071 A | 7/1999 | Morgan et al. |
| 5,930,473 A | 7/1999 | Teng et al. |
| 5,930,765 A | 7/1999 | Martin |
| 5,931,901 A | 8/1999 | Wolfe et al. |
| 5,959,945 A | 9/1999 | Kleiman |
| 5,963,916 A | 10/1999 | Kaplan |
| 6,031,795 A | 2/2000 | Wehmeyer |
| 6,049,823 A | 4/2000 | Hwang |
| 6,078,848 A | 6/2000 | Benrstein et al. |
| 6,084,168 A | 7/2000 | Sitrick |
| 6,161,142 A | 12/2000 | Wolfe et al. |
| 6,163,795 A | 12/2000 | Kikinis |
| 6,173,317 B1 | 1/2001 | Chaddha et al. |
| 6,248,946 B1 | 6/2001 | Dwek |
| 6,295,555 B1 | 9/2001 | Goldman |
| 6,304,915 B1 | 10/2001 | Nguyen et al. |
| 6,308,204 B1 | 10/2001 | Nathan et al. |
| 6,314,573 B1 | 11/2001 | Gordon et al. |
| 6,314,575 B1 | 11/2001 | Billock et al. |
| 6,336,219 B1 | 1/2002 | Nathan |
| 6,346,951 B1 | 2/2002 | Mastonardi |
| 6,363,411 B1 | 3/2002 | Dugan et al. |
| 6,381,575 B1 | 4/2002 | Martin et al. |
| 6,385,596 B1 | 5/2002 | Wiser et al. |
| 6,396,531 B1 | 5/2002 | Gerszberg et al. |
| 6,397,189 B1 | 5/2002 | Martin et al. |
| 6,442,285 B2 | 8/2002 | Rhoads et al. |
| 6,469,239 B1 | 10/2002 | Fukuda |
| 6,477,532 B1 | 11/2002 | Duliege |
| 6,487,145 B1 | 11/2002 | Berhan |
| 6,504,089 B1 | 1/2003 | Negishi et al. |
| 6,522,342 B1 | 2/2003 | Gagnon et al. |
| 6,553,409 B1 | 4/2003 | Zhang et al. |
| 6,563,769 B1 | 5/2003 | Van Der Meulen |
| 6,564,380 B1 | 5/2003 | Murphy |
| 6,571,390 B1 | 5/2003 | Dunn et al. |
| 6,578,051 B1 | 6/2003 | Mastronardi et al. |
| 6,587,403 B1 | 7/2003 | Keller et al. |
| 6,601,136 B2 | 7/2003 | Gunaseelan et al. |
| 6,805,634 B1 | 10/2004 | Wells et al. |
| 6,868,403 B1 | 3/2005 | Wiser et al. |
| 6,915,451 B2 | 7/2005 | Fitzgerald et al. |
| 6,970,834 B2 | 11/2005 | Martin et al. |
| 6,978,127 B1 | 12/2005 | Bulthuis et al. |
| 7,010,801 B1 | 3/2006 | Jerding et al. |
| 7,024,465 B1 * | 4/2006 | Young et al. .................. 709/219 |
| 7,117,516 B2 | 10/2006 | Khoo et al. |
| 7,133,845 B1 | 11/2006 | Ginter et al. |
| 7,263,497 B1 | 8/2007 | Wiser et al. |
| 7,383,564 B2 | 6/2008 | White et al. |
| 7,392,532 B2 | 6/2008 | White et al. |
| 7,493,643 B2 | 2/2009 | Ellis |
| 7,493,647 B2 | 2/2009 | White et al. |
| 2001/0025259 A1 | 9/2001 | Rouchon |
| 2001/0044846 A1 * | 11/2001 | Cohn et al. ..................... 709/227 |
| 2002/0035644 A1 | 3/2002 | Scibora |
| 2002/0040389 A1 * | 4/2002 | Gerba et al. .................. 709/219 |
| 2002/0188363 A1 | 12/2002 | Ashy |
| 2003/0177247 A1 * | 9/2003 | Dunning et al. .............. 709/228 |
| 2003/0220984 A1 * | 11/2003 | Jones et al. ................... 709/219 |
| 2004/0010629 A1 * | 1/2004 | Diesel et al. .................. 709/250 |
| 2004/0107242 A1 | 6/2004 | Vert et al. |
| 2008/0195443 A1 | 8/2008 | Nathan et al. |
| 2009/0164607 A1 * | 6/2009 | Clark et al. ................... 709/219 |

FOREIGN PATENT DOCUMENTS

| | | |
|---|---|---|
| EP | 1 408 427 A2 | 4/2004 |
| GB | 2062935 | 5/1981 |
| GB | 2170943 | 8/1986 |
| GB | 2193420 | 2/1988 |
| WO | WO 97/45796 | 12/1997 |
| WO | WO 98/45835 | 10/1998 |
| WO | WO 01/08148 | 2/2001 |

OTHER PUBLICATIONS

Jeffrey Fritz, True Believers Say Isochronous Ethernet Will Bring Digital Video to the Desktop Sooner, Byte.com, May 1995.

Victoria Shannon, Board Bulletin, David Clark, The Washington Post, Jul. 26, 1995.

H.Maurer, The A.E.I.O.U Hypermedia Project, IEEE, 1994, pp. 192-196.

Author Unknown, Darts Revolution Again, Replay Magazine, Mar. 1991.

* cited by examiner

PRIORITIZED CONTENT DOWNLOAD FOR AN ENTERTAINMENT DEVICE

BACKGROUND OF THE INVENTION

Traditional entertainment devices for out-of-home use, for example in restaurants or bars, are typified by the jukebox that plays selected vinyl records or compact discs after the insertion of coins or paper currency.

A company may develop and market a particular entertainment device platform, which may be licensed to a manufacturer that manufactures the entertainment device. This device may be sold to operators who, in turn, form agreements with individual venues to locate an entertainment device at that venue. Patrons of the venue may operate the entertainment device to provide the desired content, such as to play a selected song or display a selected music video. In many cases, the entertainment device hardware is owned by the operator, who forms some sort of revenue agreement with the venue owner.

An operator may own large numbers of entertainment devices that are installed and operated in a widely dispersed geographic region. In the past, conventional jukebox operators would personally visit each venue in order to update the music selection and to monitor the number of song plays for each individual entertainment device. These operators would have "routes" they would travel regularly in order to visit, access, and update their various entertainment devices. Later, network-enabled entertainment devices were developed so that new music could be distributed by a central host system to the network-enabled entertainment devices without requiring a human operator to manually install new storage media (e.g., vinyl records or compact discs). The operator was able to remotely select music or other entertainment content to be downloaded for local storage on the jukebox. The system administrator at the host system may create configuration and software updates for each of the entertainment devices. The host system may then inform each entertainment device that new files are available for download and installation.

Early network-enabled jukeboxes utilized modems and telephone lines in order to make network connections with the host system to download new music and other files used to operate the jukebox. Typically, these modem-enabled jukeboxes would dial into the host system at a certain time each day in order to download any necessary files. These files may include entertainment media files to be locally stored so that they may be performed upon request by consumers, advertising-related files used to attract consumers to the jukebox and to encourage them to purchase entertainment content, and operational files used to control the operation of the jukebox. This downloading was typically performed when the venue was closed for business so as not to interrupt service to customers and thereby reduce revenue. Unfortunately, this would provide a limited window of time during which files could be transferred over the network connection. Even when broadband connections to the jukeboxes became economically feasible for these venues, there still remained a limited amount of bandwidth that could be utilized at any particular time. When large files, such as video files, major software updates, or large album orders, were to be downloaded, the broadband connection may be fully consumed for extended periods of time.

Accordingly, it may be desirable to provide an entertainment system that can efficiently and effectively download files with minimal impact on the consumer experience.

SUMMARY OF THE INVENTION

In accordance with embodiments of the present invention, a priority-based content retrieval mechanism for digital entertainment devices is provided. The download prioritizations may be interrupt-based, sequence-based, or a combination of the two. In interrupt-based prioritizations, a higher priority download request will interrupt a lower-priority download that is already in progress. In sequence-based prioritizations, a plurality of file download requests may be ordered in a download queue depending on the priority of the request, with higher priority requests being positioned towards the top of the queue and lower priority requests being positioned towards the bottom of the queue.

In one embodiment, the highest priority is assigned to download requests for entertainment content having a scheduled performance. This scheduled performance may correspond to a precise performance time (e.g., a song, advertising video, or advertising banner scheduled to be performed at exactly 8:00 pm), a sequentially scheduled performance (e.g., a song or video request scheduled to play when its turn comes up in the performance queue), or a combination of both (e.g., an advertising video scheduled to play at exactly 8:00 pm, unless a consumer-requested entertainment content is being performed, in which case the advertising video will play immediately after).

In accordance with certain embodiments, a priority-based content retrieval mechanism allows system owners and operators to update entertainment devices with files that represent new software and unscheduled entertainment content at any time that the device is not otherwise using the network connection. Retrieval of this content is assigned a low priority. If a consumer uses the entertainment device to request on-demand entertainment content that is not already on the device, that download request is assigned a high priority. The retrieval of any low priority content that is in progress is suspended and all files that make up the high priority content are retrieved first. After there are no more outstanding high priority requests for content, the device may return to acquiring low priority content.

In accordance with embodiments of the present invention, an entertainment system is provided, comprising: a storage device for storing files; a network interface for coupling the entertainment system with a host system over a network; a content retrieval module for managing file download requests to the host system, wherein if the content retrieval module receives a request to retrieve a file having a scheduled performance and not stored on the storage device, the content retrieval module retrieves the scheduled performance file from the host system with a higher priority than unscheduled files. An unscheduled file is a file that does not have a scheduled performance. The unscheduled file may comprise, for example, an entertainment content file that is to be made available for future requests for performances, or an operational file that is used to control the operation of the entertainment device and is not performed for consumers.

In accordance with embodiments of the present invention, a method of prioritizing download requests for an entertainment system having a user interface is provided, comprising: storing a plurality of file download requests with no scheduled performances; initiating a download of a first file download request from the plurality of file download requests; receiving a file download request having a scheduled performance; and prior to downloading the remaining file download requests in the plurality of file download requests with no scheduled performances, initiating a download for the file download request having the scheduled performance.

In accordance with embodiments of the present invention, an entertainment system is provided, comprising: a user interface module for receiving entertainment content requests from a user; a storage device for storing digital entertainment content files; a network interface for coupling the entertainment system with a host system over a network; a requested files queue for storing a plurality of files that the host system instructed the entertainment system to retrieve; and a content retrieval module for managing file download requests to the host system, wherein if the content retrieval module receives an entertainment content request from the user interface module corresponding to a first entertainment content file not stored on the storage device, the content retrieval module retrieves the first entertainment content file from the host system with a higher priority than files that the host system instructed the entertainment system to retrieve.

In accordance with embodiments of the present invention, a method of prioritizing download requests for an entertainment system having a user interface is provided, comprising: storing a plurality of file download requests; initiating a download for a first file download request from the plurality of file download requests; receiving a user-based file download request from the user interface; and prior to downloading the remaining file download requests in the plurality of file download requests, initiating a download for the user-based file download request.

In accordance with embodiments of the present invention, an entertainment system is provided, comprising: a user interface module for receiving entertainment content requests from a user; a storage device for storing digital media files; a network interface for coupling the entertainment system with a host system over a network; and a content retrieval module for managing file download requests to the host system, wherein a user-based file download request receives a higher download priority than a non-user-based file download request.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DETAILED DESCRIPTION

Figure 1:
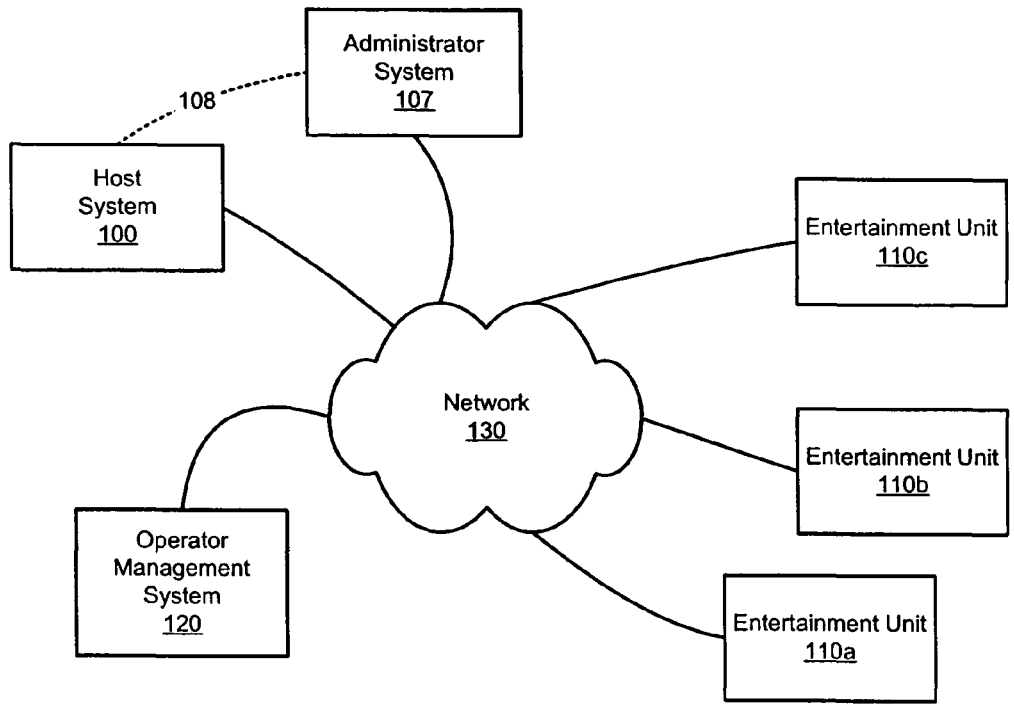
FIG. 1 shows a block diagram of an exemplary environment for embodiments of the present invention.

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

A priority-based content retrieval mechanism is provided for an entertainment device. In accordance with embodiments of the present invention, the content retrieval mechanism creates a prioritization scheme for downloading files from a host system. This prioritization scheme may be configured to download scheduled entertainment content with a higher priority than unscheduled content. The scheduled entertainment content is scheduled for performance by the device, so it is desirable to retrieve any files needed for the scheduled performance with a higher urgency than files that may be used in the future but have not yet been scheduled for a particular performance time.

In one form of entertainment content scheduling, the entertainment device may allow consumers to request that various entertainment content be performed. This performance may comprise, e.g., the playback of a song on an audio system, the playback of a video on an audio-visual system, the execution of a video game, and the display of graphics and/or text. This request may be in exchange for some form of payment from the consumer, or may be provided as free service to the consumer by the venue where the entertainment device is located. In either case, it is desirable to provide a smooth and rapid response to all consumer requests so as not to detract from the consumer experience.

The entertainment device may include a storage device that locally stores a plurality of entertainment content files, such as a plurality of songs or videos stored in digital form. When the consumer requests that one of these songs or videos be played, the device can retrieve the song or video from its local storage and begin playback. In other cases, the consumer may request entertainment content that is not locally available, so the device will attempt to retrieve the entertainment content from a host system over a network. If the entertainment device is already retrieving non-consumer-driven content, it may be desirable to interrupt that download in order to retrieve the higher priority consumer-driven entertainment content without excessive delay for the consumer. Once the consumer-driven content has been retrieved, the entertainment device may return to retrieving the non-consumer-driven content. The non-consumer-driven content may comprise, for example, entertainment content catalog updates, unscheduled entertainment content files for local storage, advertising content files, and operational files.

FIG. 1 shows a block diagram of an exemplary environment for embodiments of the present invention. A host system 100, one or more entertainment devices 110, and an operator management system 120 are couplable over a network 130. The network 130 may comprise, for example, a wide-area network (WAN) such as the internet, and the various systems 100, 110, and 120 may connect to the network 130 via various mechanisms, as would be understood by those of ordinary skill in the art. For example, the systems may have broadband connections to the internet, and may be continuously or intermittently coupled to the network 130.

Figure 2:
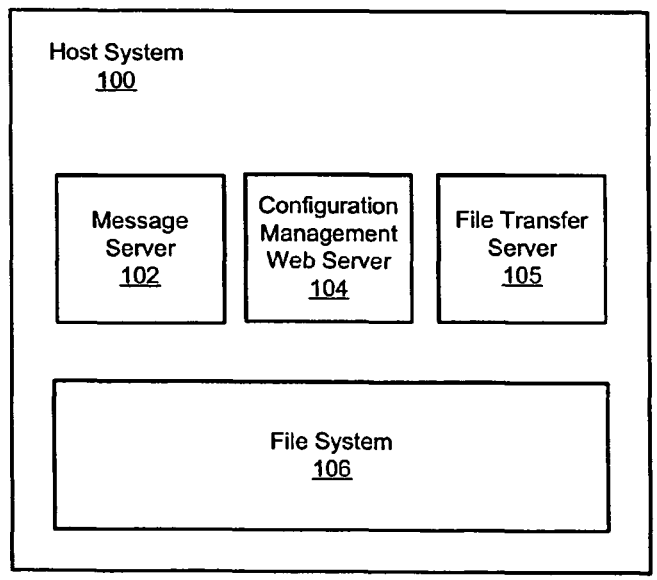
FIG. 2 shows a host system for managing entertainment devices, in accordance with embodiments of the present invention.

The host system 100 may comprise a central management system for controlling the various entertainment devices 110 and for distributing entertainment content, such as music, video, or text files, and operational content, such as software updates, to those devices 110. This host system 100 may take various forms, one example of which is shown in FIG. 2. The host system 100 shown in FIG. 2 comprises multiple components which may be implemented on a single server or across multiple servers. The illustrated host system 100 is a simplified block diagram of an exemplary system 100 with various components omitted for clarity, and in other embodiments, the host system 100 may be configured differently. As shown, the host system 100 comprises one or more message servers 102 which can transmit and receive messages to and from the entertainment devices 110. The host system 100 may further comprise one or more configuration management web servers 104, which control the user interface application accessed by the operator management system 120.

A file system 106 is provided for storing various files that may be downloaded to the entertainment devices 110. The file system 106 may comprise, e.g., a storage subsystem containing operational files, such as, e.g., software patches, executable programs, graphic files for use in the entertainment device's user interface, configuration setting files, or other files that may be used to control the operation of the entertainment device 110, and entertainment content files such as, e.g., digital audio files, multimedia files, text files, game files, and other files that may be performed for consumers at the venue location. The file system 106 may further store metadata associated with the entertainment content, such as, e.g., title, artist, and album information corresponding to each musical song file. One or more file transfer servers 105 may be provided for managing the transfer of files from the file system 106 to the various entertainment devices 110. Each of the files stored in the file system 106 may be associated with a unique Content ID to enable entertainment devices 110 to easily identify and retrieve files from the file system 106.

The operator management system 120 in FIG. 1 may comprise a computer system used by an operator who owns or manages one or more of the entertainment devices 110a-110c. The operator management system 120 may provide the operator with access to a user interface for configuring the settings on one or more of the entertainment devices 110 and for selecting the entertainment content to be provided at each of the entertainment devices 110 controlled by that operator. The operator management system 120 may comprise a browser application for providing a web-based user interface to the host system 100. For example, the operator may use the web-based user interface to select new albums or individual songs available on the host system 100 to download onto one of that operator's entertainment devices 110, thereby making those songs available to consumers at the device 110's location. In addition, the operator may select albums or songs to remove from the local storage on the entertainment device 110 in order to make more storage space available for new content.

An administrator may manage the host system 100 directly or may use a separate administrator system 107 to interface with and control the host system 100. The administrator system 107 may comprise a separate computer system couplable to the host system 100 via a wide-area network (WAN), such as network 130, or via a local-area network (LAN) 108.

The entertainment devices 110 may comprise any of a variety of network-enabled entertainment devices, such as, e.g., freestanding jukeboxes, wall mounted jukeboxes, countertop units, and gaming units. These entertainment devices 110 may provide users with entertainment content in various forms, such as, e.g., audio, video, graphics, video games, software, text, and combinations thereof. For example, a jukebox may enable customers to select songs to play, a video jukebox may enable customers to select songs or music videos to play, and a countertop unit may enable customers to read the news, view photographs, and play games. The countertop unit may further be configured to also allow customers to request songs and/or music videos to be played. These entertainment devices 110 may be located, e.g., in a bar, restaurant, or other facility open to the public, in order to generate revenue by providing the entertainment content in exchange for payment from users, or free to users, but paid for by operators or venue managers.

Figure 3:
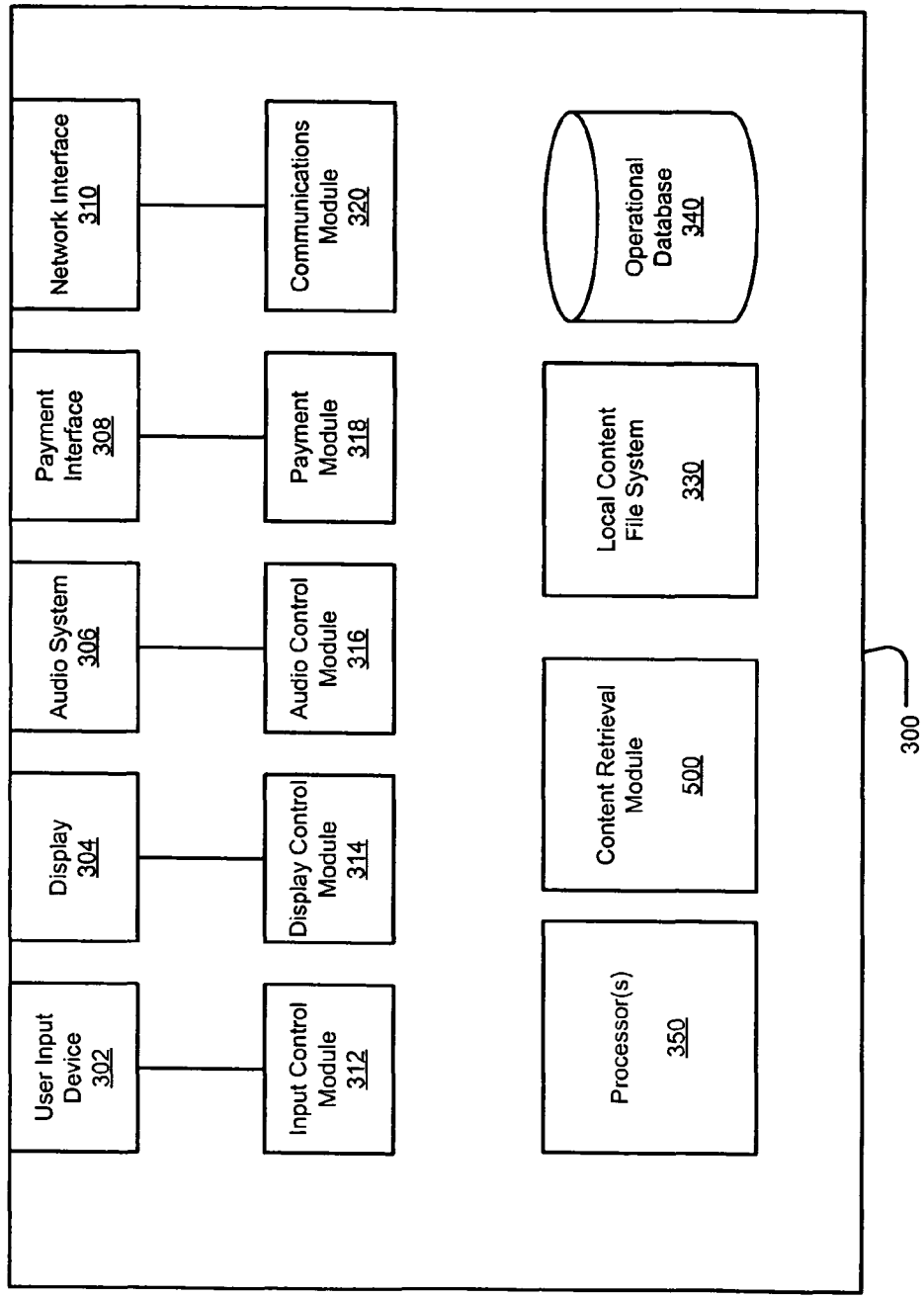
FIG. 3 is a block diagram of an entertainment device, in accordance with embodiments of the present invention.

FIG. 3 is a block diagram of an exemplary entertainment device with certain components omitted for clarity. The illustrated entertainment device comprises a jukebox 300. The jukebox 300 may take various forms, but in the illustrated embodiment comprises a user input device 302, which enables a customer at a venue to input commands into the jukebox 300. The user input device 302 may comprise, e.g., a keyboard, a touchpad, a mouse, a touch screen, or other input device or combination of input devices, as would be understood by those of ordinary skill in the art. The jukebox 300 may further comprise a display 304, which may comprise, e.g., one or more computer monitors. The display 304 can be used as a user interface for consumers to select the desired entertainment content, to display the visual entertainment content requested by customers, to attract customers to the device, to enable authorized personnel to manage the device, or combinations of the above. For example, a jukebox 300 may have a first computer monitor for displaying requested visual entertainment content, such as a music video, and a second touch screen computer monitor for providing a user interface to allow consumers to search and request performance of entertainment content while the requested visual entertainment content are performed on the first computer monitor.

An audio system 306 may be provided for performing the audio entertainment content requested by the customer. The audio system 306 may comprise an amplifier and audio speakers for playing music. In other embodiments, the audio system 306 may couple to an amplifier and/or speakers located elsewhere in the venue external to the jukebox 300. A payment interface 308 may be provided for receiving payment from customers in exchange for providing the entertainment content. In some embodiments, the payment interface 308 may comprise a coin and/or bill collector for receiving cash or token payment, a debit/credit card reader for reading the magnetic strip on customer debit or credit cards and for requesting payment authorization from the financial services provider associated with that debit or credit card, a smart card reader, any combination of the above, or any other payment receiving mechanism. A network interface 310 provides an interface between the jukebox 300 and the network 130 and may comprise, e.g., an RJ-11 port, a wireless adapter, or a modem. The jukebox 300 also comprises an input control module 312, a display control module 314, an audio control module 316, a payment module 318, and a communications module 320 to provide computer control of the various components described above.

A local content file system 330 stores files used to operate the jukebox 300. These files may include the entertainment content files and operational files. An operational database 340 is provided for controlling the operation of the jukebox 300, as will be described in greater detail below. One or more processors 350 may be provided for executing the various functions for the jukebox 300. The local content file system 330 may be stored on a storage device, such as a hard drive or array of hard drives, that is accessible on the same local bus as the processor 350. In other embodiments, the local content file system 330 may be stored on storage device accessible to the processor 350 via a LAN. Finally, a content retrieval module 500 may be provided, as will be described in greater detail below. The jukebox 300 may be implemented using, for example, standard personal computer hardware and architecture.

Figure 4A:
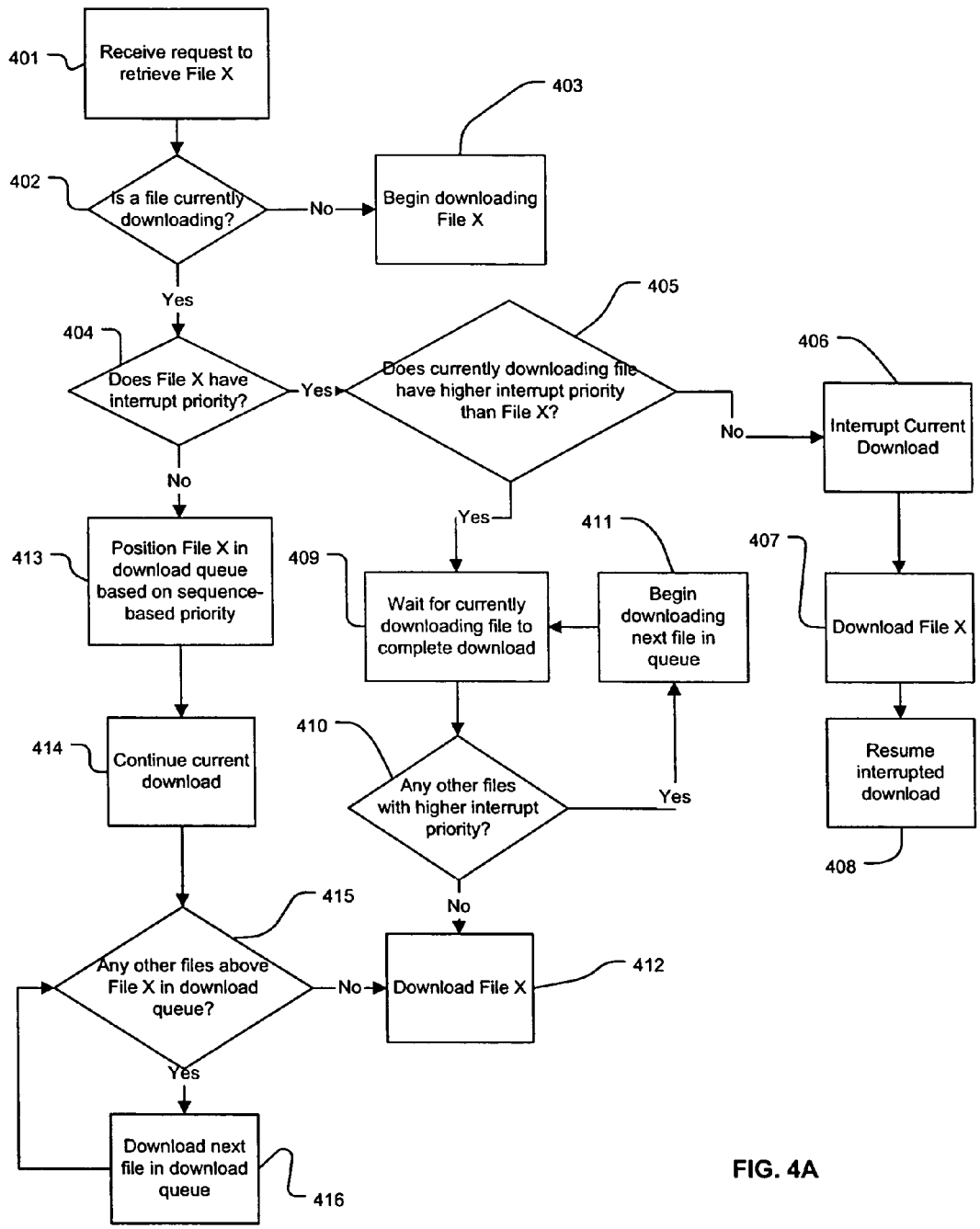
FIGS. 4A-4B are flowcharts showing methods of performing priority-based content retrieval, in accordance with embodiments of the present invention.

FIG. 4A is a flowchart showing a method of performing priority-based content retrieval, in accordance with embodiments of the present invention. This method incorporates both interrupt-based prioritizations and sequence-based prioritizations. In step 401, the content manager for an entertainment device receives a request to retrieve File X. In decision step 402, the content manager checks to see whether it is already downloading another file. If not, then in step 403, the content manager begins downloading File X from the host system 100.

If the content manager detects that another file is currently in progress, then the content manager in decision step 404 determines whether File X has been assigned an interrupt priority. This interrupt priority indicates that the retrieval of File X is sufficiently urgent that any other non-interrupt priority downloads in progress should be suspended in favor of File X. An interrupt priority may be assigned, for example, to any file that has an upcoming scheduled performance. This scheduled performance may correspond to a precise performance time, a sequentially scheduled performance, or a combination of both.

As an example of a precise performance time, an advertiser may purchase at 7:45 pm a video advertisement to be displayed on the entertainment device at 8:00 pm. Because the performance time of the advertisement is impending, it may be desirable for the entertainment device to interrupt any pending downloads having lower priorities in order to make bandwidth available for the download of the video file for the advertisement.

As an example of a sequentially scheduled performance, a consumer may use the user interface of the entertainment device to select entertainment content to be performed. This may comprise, e.g., a request to play a song on a jukebox. If other songs have previously been selected by other consumers, the newly requested song will be placed in a sequential queue to be performed once that song reaches the top of the queue. Although no precise performance time is established, the entertainment content (i.e., the requested song) has a sequentially scheduled performance and if it not already locally stored, the entertainment device should assign an interrupt priority to the requested file so that the requested song may be played without undue delay for the consumer.

As an example of a combination, an advertiser may purchase an advertising video to be played at exactly 8:00 pm, unless consumer-requested entertainment content is being performed, in which case the advertising video will play immediately after the consumer requested content is completed. Again, the advertising video may not play at a precisely predetermined time, but has a scheduled performance and should be downloaded with high priority in order to avoid delays.

In some embodiments, it may be desirable to have multiple interrupt priorities, so that if multiple file requests are received having interrupt priorities, the content manager may identify the most urgent file and retrieve that file first. In other embodiments, a single interrupt priority may be used, with the content manager retrieving all of the files having interrupt priorities in sequential order. In some embodiments, the priority assigned to each file request may be a function of the revenue generated for that file request. For example, a consumer request for a song may generate $1 in revenue and should be assigned a higher priority than a software file download request, which does not generate any revenue. On the other hand, an advertiser's request to purchase a video advertisement to be played on 100 entertainment devices may generate $50,000, and accordingly may be assigned a higher priority than the consumer request. Other prioritization schemes are possible.

Going back to FIG. 4A, if the content manager determines that File X has an interrupt priority, then in decision step 405, the content manager determines whether the file currently being downloaded has a higher interrupt priority than File X. If not, then in step 406, the current download is interrupted, and in step 407, the content manager begins downloading File X. After the downloading of File X is complete, the content manager may resume downloading the interrupted file in step 408.

If the file currently being downloaded has a higher interrupt priority than File X, then in step 409, File X is held in queue until the file in progress completes its download. After the download is complete, the content manager checks in decision step 410 to see whether there are any other files having an interrupt priority higher than File X. If so, then in step 411, the higher priority file is retrieved and File X is maintained in queue until the downloading of the higher priority file is complete. Once File X is the file in queue having the highest interrupt priority, then in step 412, File X is downloaded.

If in decision step 404, it was determined that File X does not have interrupt priority, then in step 413, File X may be positioned in a download queue based on a sequence-based priority. In step 414, the current download continues. After the current download completes, then the content manager in decision step 415 determines whether there are any other files above File X in the download queue. If so, then in step 415, the next file in the queue is downloaded. Once File X reaches the top of the download queue, it is downloaded in step 412 (assuming that no interrupt priority file requests have been issued in the interim).

The sequence-based prioritizations may be desirable in order to prioritize the downloading of files that do not have a scheduled performance. For example, an operator using the operator management system 120 may request that a song corresponding to File X be downloaded for local storage on a jukebox 300. The song will then be made available to consumers on the locally stored catalog, but will not be performed until a consumer requests it. Because popular music is constantly changing, it may be desirable for File X to be downloaded without undue delay. However, if a software patch needs to be installed on the jukebox, it may be desirable to give the software patch a higher priority than File X. Thus, when the request to retrieve the software patch is received, the request is placed in the download queue above File X. Similarly, if a request is received to download a trivial user interface graphic file, it may be desirable to give this operational file a lower priority than File X. Therefore, the request will be placed in the download queue below File X. However, the downloading of all of these files will be interrupted in favor of downloading any file request having an interrupt priority.

By utilizing both interrupt-based and sequence-based prioritizations, flexibility may be achieved in prioritizing file download requests. In other embodiments, it may be desirable to utilize only a sequence-based prioritization, where urgent files having scheduled performances are placed at the top of the download queue, but any pending file downloads are not interrupted. In other embodiments, it may be desirable to utilize only an interrupt-based prioritization, where the download queue is treated as a first-in, first-out queue, so that each new file request is placed at the bottom of the queue. The download sequence would only be altered for file requests having an interrupt priority. These requests would suspend any downloads in progress.

Figure 4B:
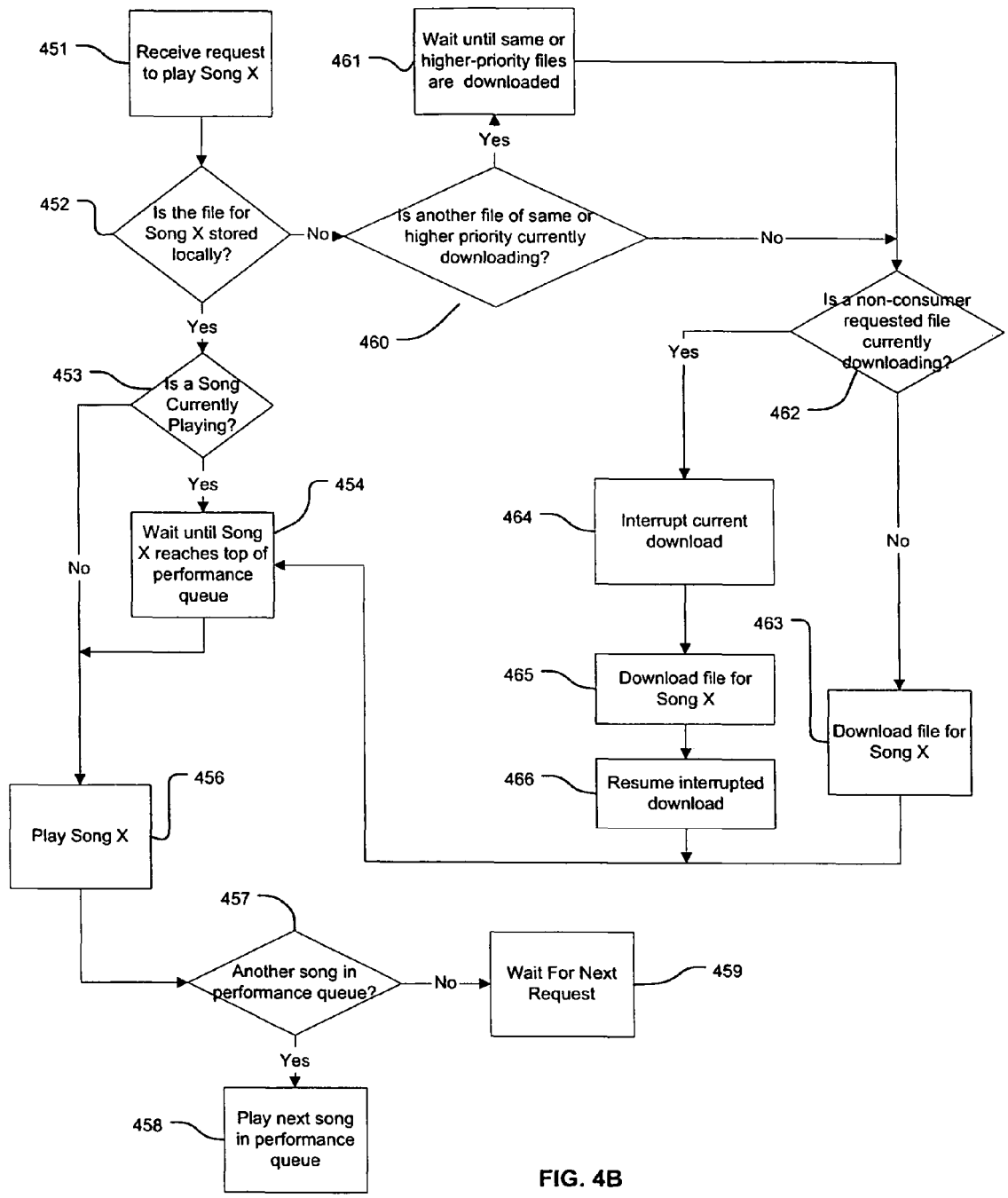

FIG. 4B is a flowchart of a method for performing priority-based content retrieval for a jukebox, in accordance with embodiments of the present invention. In this embodiment, entertainment content that has been requested by a consumer is assigned an interrupt priority. In step 451, a consumer requests that Song X be played on the jukebox 300. In decision step 452, the content manager determines whether the file corresponding to Song X is stored locally in the local content file system 330. If the file is locally available, then in decision step 453, the content manager determines whether another song is currently being performed. If so, then in step 454, Song X is maintained in the performance queue until it reaches the top of the queue. If no other songs are being performed, then in step 456, Song X is played. If there is another song in the performance queue, then in step 458, the next song in the performance queue is played. If not, then in step 459, the jukebox 459 waits for the next song request.

If the file corresponding to Song X is not locally stored, then in step 460, the content manager determines whether another file of the same or higher priority is currently being downloaded. For example, the content manager may check to see whether any other consumer-requested files are being downloaded. If so, then in step 461, the content manager waits until the same or higher priority downloads are completed. If no same or higher priority files are being downloaded, then in decision step 462, the content manager determines whether any lower priority files are currently downloading. For example, the content manager may check to see whether any non-consumer requested files are being downloaded. If not, then in step 463, the file for Song X is downloaded. If so, then in step 464, the current lower-priority file download is interrupted, and in step 465, the higher priority file for Song X is downloaded. After the download is complete, then in step 466, the interrupted download is resumed. Song X is then maintained in the performance queue in step 454.

Figure 5:
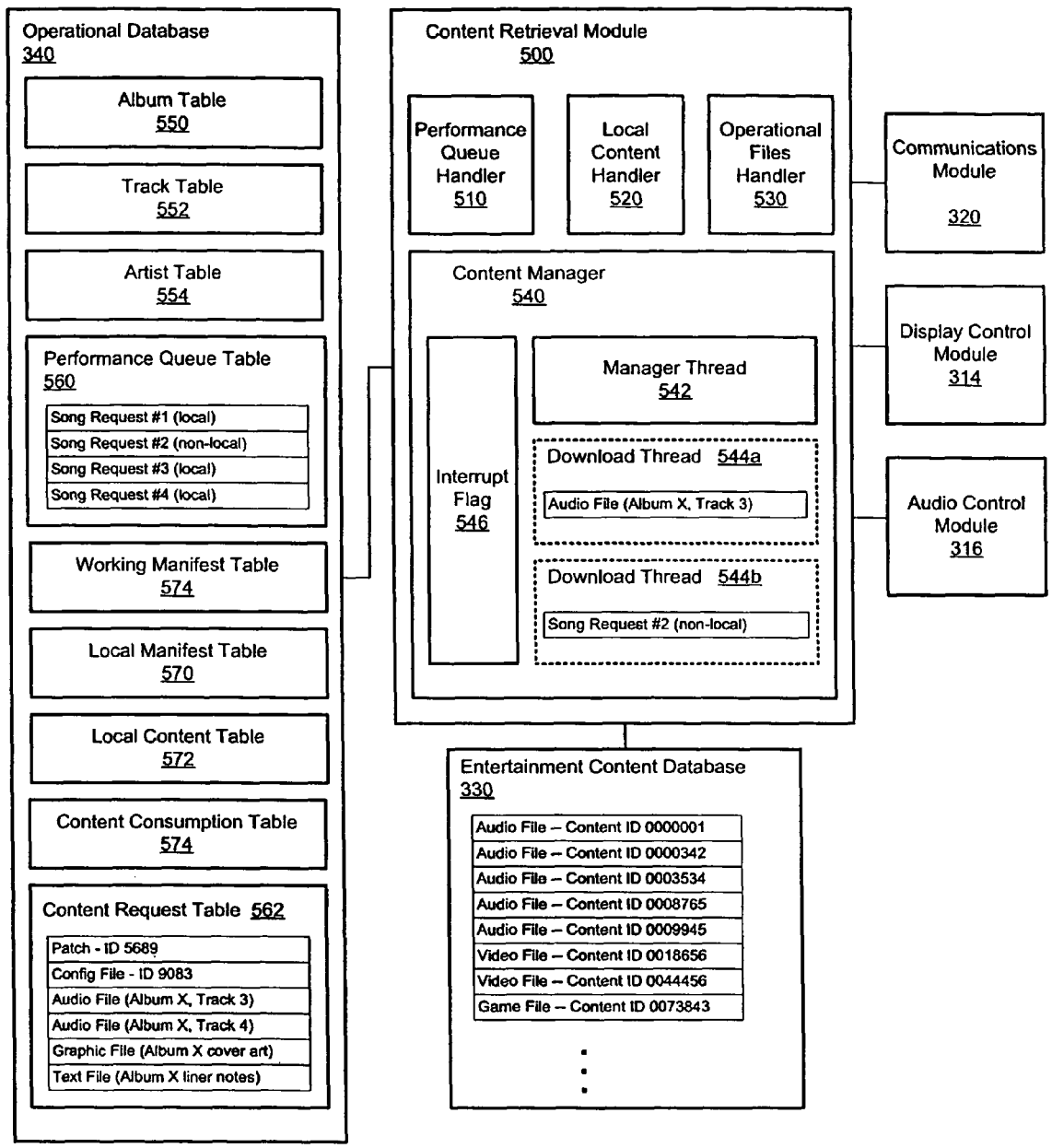
FIG. 5 is a block diagram of a content retrieval module, in accordance with embodiments of the present invention.

FIG. 5 is a block diagram of a content retrieval module 500 that may be used to manage the retrieval of files for an entertainment device in accordance with embodiments of the present invention. The content manager 540 manages the retrieval of content for the entertainment device, both from local storage and from the host system 100. The content manager 540 implements the logic for prioritizing the file downloads from the host system, as will be described in greater detail below.

Various data structures may be used to implement the prioritized content download methods described herein. In the embodiment shown in FIG. 5, a plurality of tables are stored in the operational database 340 and are used by the content retrieval module 500 to implement the prioritized content download methods for a jukebox 300. The track table 552 identifies every individual song track available on the file system 106 of the host system 100. For each entry, the track table 552 stores a unique Track ID, a unique Content ID used to identify the track in the file system, the Album ID for any album to which the track corresponds, any other files or data associated with the track (e.g., descriptive data for the track, such as the song title and artist name, graphics associated with the track, and liner notes), and the status of that song track on that jukebox as local, non-local, or in-transit.

The album table 550 may be used to identify every album available on the file system 106 of the host system 100. For each entry, the album table 550 stores a unique Album ID, any files or data associated with that album (e.g., descriptive data for the album, such as the album title and artist name, graphics associated with the album, such as the album cover art, and liner notes), and the status of that album on that jukebox as local, non-local, or in-transit. The album table 550 may be used to organize the song tracks when they are presented to consumers in the display 304.

An artist table 554 may be used to identify every artist whose entertainment content available on the file system 106 of the host system 100. For each entry, the artist table 554 may store a unique Artist ID and any files or data associated with that artist (e.g., descriptive information about the artist, all albums and tracks by that artist, and graphics associated with the artist). The artist table 554 may be used to organize the song tracks when they are presented to consumers in the display 304.

It may be impractical to store an entire catalog of entertainment content locally in each jukebox, due to the limited storage capacities available at each jukebox and the load imposed to continuously update the local catalog to include all new entertainment content as it is released. Accordingly, each jukebox operator may select a limited subset of the entertainment content to store locally. The jukebox 300 may then be configured such that consumers can search through two different catalogs of entertainment content. One catalog may contain a list of all entertainment content that is locally stored in the local content file system 330 of the jukebox 300, and a second catalog may contain the complete list of entertainment content that is available on the file system 106 of the host system 100. It may be desirable to provide consumers with the option of selecting a song from the local catalog for a first purchase price or selecting a song from the much larger catalog of the host database for a second, usually higher, price. It has been observed that consumers are often willing to pay an additional premium to select particular songs that have not been selected by the jukebox's operator to include locally.

The performance queue table 560 stores a list of entertainment content files that are waiting to be played and a flag to indicate whether the file is locally stored or whether the entertainment content must be retrieved from the file system 106 of the host system 100 before it can be performed. In other embodiments, there may be multiple performance queues to manage the performance of different types of entertainment content or to manage the performance of entertainment content on different output mechanisms, such as for an entertainment device having multiple video screens or playing different music into different rooms in a venue.

The working manifest table 574 contains a list of Content IDs for all operational files that should be installed on the jukebox and a flag to indicate whether each file is already locally stored or still needs to be acquired. These operational files may comprise any non-entertainment content files used to control the operation of the jukebox 300. For example, the operational files may comprise software patches, executable programs, graphic object files for use in the entertainment device's user interface, configuration setting files, or other files that may be used to control the operation of the jukebox 300.

The local manifest table 570 contains a list of all Content IDs of operational files that have already been installed on the jukebox.

The local content table 572 contains a list of all Content IDs for every file (e.g., operational files and entertainment content files) that is locally stored on the jukebox.

The content consumption table 574 contains a list of all Content IDs for every file that should be stored locally. The jukebox 300 may periodically receive update messages from the host system 100 providing the jukebox 300 with a list of all files that the jukebox 300 should have, including any new entertainment content files selected by the operator to be locally stored on the jukebox 300 and operational files that the host system 100 wishes to distribute to all of the jukeboxes 300 in the network. Accordingly, the files that are in the content consumption table 564 but are not yet in the local content table 572 represent the files that need to be retrieved from the host system 100.

The content request table 562 contains a list of all pending downloads (e.g., files that are in queue to begin downloading) and partial downloads that have been presented to the content manager 540 to retrieve from the host system 100, as will be described in greater detail below. For each of the downloaded files, the content request table 562 stores a historical record of the download start time, the download end time, download retry attempts, interrupt locations, if any, and overall download performance. The jukebox 300 may transmit this information to the host system 100 so that the host system 100 can track performance of the entertainment devices 110 on the network.

The content retrieval module 500 may comprise various objects for handling the operation of the entertainment device 110. A performance queue handler 510 is provided for managing all consumer entertainment content requests and maintaining the performance queue table 560. These requests may be for the jukebox 300 to perform entertainment content that is locally stored or for entertainment content that is only available at the host system 100. In FIG. 5, the performance queue handler 510 has stored four songs requested by one or more consumers in the performance queue table 560. Song requests #1, #3, and #4 are for song files that are locally stored, and song request #2 is for a song file that is not locally stored. It will be understood that the performance queue table 560 may store a queue of different types of entertainment content as well. For example, one of the entries could be for a music video, and the other entries may be for audio songs only. In other embodiments, separate queues may be used to store entertainment content to be performance using different output systems (e.g., a first queue to store video requests, a second queue to store audio requests, and a third queue to store requests to download non-locally stored video games). The performance queue handler 510 will maintain all consumer requests in the performance queue table 560 until the requested file is available and next in sequence to be played. Once each requested file reaches the top of the queue, the file is transferred to the appropriate output device (e.g., the audio control module 316 and/or the display control module 314) to be performed.

The local content handler 520 maintains a catalog of all entertainment content that has been selected to be locally stored on the entertainment device 110 and maintains this information on the content consumption table 574. Typically, for jukeboxes, the owner or operator of the jukebox may add or delete several albums or more from the jukebox each month, in order to keep up with the current state of popular music. This may be accomplished, for example, by using the operator management system 120 to enter album selections into the host system 100. The host system 100, in turn, may transmit a list of the newly selected albums to the target jukebox 300 to indicate to the jukebox 300 that new albums need to be downloaded.

In one embodiment, the host system 100 transmits to the local content handler 520 a complete list of the local catalog of albums selected by the operator for local storage on the jukebox 300. This transmission may occur on a regular schedule, e.g., once per day, or may occur upon request by the jukebox 300. The local content handler 520 may then compare the newly-received local album catalog list to the content already stored in the local content table 572. This comparison is used to determine the elements that should be acquired in order to complete the newly-received local album catalog list. These elements may include, for example, the individual audio files corresponding to each song in the album, one or more graphic files corresponding to album cover art, and text files containing information about the artist, songs, and/or album. The local content handler 520 then passes the requests to retrieve entertainment content files to the content manager 540. In one embodiment, local content handler 520 issues requests to retrieve these files using an AddReference function.

The operational files handler 530 manages the operational files used to operate the jukebox and maintains the local manifest table 570. In one embodiment, the host system 100 may transmit to each entertainment device 110 a list of operational files that the entertainment device 110 should have installed. The operational files handler 530 then checks the local manifest table 570 to determine which files the jukebox should download in order to have a complete set of files for operation. The operational files handler 530 may issue requests to retrieve files to the content manager 540 using the AddReference function. After the operational files are downloaded, the operational files handler 530 can install the software.

The content manager 540 utilizes a manager thread 542 that determines what content to retrieve from the host system 100. The manager thread 542 may run at all times that the jukebox 300 is operating and may initiate transitory download threads 544 to perform individual file downloads from the host system 100.

In accordance with embodiments of the present invention, the content manager 540 retrieves files from the host system 100 based on a prioritization scheme. Each time an AddReference function call is made, the content manager 540 determines whether any other downloads are currently being performed. If no other downloads are in progress, the content manager 540 initiates a new download thread 544 to perform the download for the requested file. If the content manager 540 is already retrieving another file, the newly requested file is placed in queue in the content request table 562 to be downloaded when all previously requested files have been retrieved.

If the requested file has a high priority (such as, for example, when a consumer requests that a non-locally stored song be played or when an advertiser requests that an advertisement be downloaded and performed at a scheduled time), the file may be assigned an interrupt priority to indicate to the content manager 540 that any less urgent downloads should be interrupted and suspended to retrieve the requested high priority file. This can be done, for example, by the performance queue handler 510 by issuing an AcquireImmediate function to the content manager 540. When the content manager 540 receives an AcquireImmediate function call, the content manager 540 immediately initiates a new download thread 544b to retrieve the high priority requested file and sets the interrupt flag 546 to true. Each download thread 544 is configured to check the interrupt flag 546 periodically when retrieving files to determine whether a higher priority download thread has been initiated.

For example, as shown in FIG. 5, the content request table 562 includes a list of files to be downloaded from the host system. Four of these files correspond to Album X, and include song track 3, song track 4, a cover art graphic file (to be displayed to the user when browsing the jukebox song catalog), and a text file of the Album X liner notes (also optionally displayed to the user when browsing the jukebox song catalog). The content request table 562 also includes two operational files, a patch having Content ID 5689 and a configuration file having Content ID 9083.

A first download thread 544a is downloading the audio file corresponding to Album X, Track 3 from the file system 106 of the host system 100. During the download process, which may take, e.g., approximately 4 minutes, depending on the size of the audio file and the speed of the network connection, the download thread 544a may check the interrupt flag 546 after each block of data is retrieved from the host system 100. When a consumer requests that non-locally stored entertainment content be performed (e.g., a consumer pays for non-local song request #2 to be played), the performance queue handler 510 issues an AcquireImmediate function call to the content manager 540. In response, the content manager 540 initiates a second download thread 544b and sets the interrupt flag 546 to true. After the first download thread 544a retrieves the next complete block of data from the host system 100, the first download thread 544a will check the interrupt flag 546 and detect that the interrupt flag 546 is set to true. In response, the first download thread 544a will interrupt the pending download of the Album X, Track 3 audio file, record the download progress prior to the interrupt, and inform the second download thread 544b that the first download thread 544a will be killed. After receiving this confirmation from the first download thread 544a, the second download thread 544b will begin to retrieve the local song request #2 from the host system 100. In other embodiments, the second download thread 544b may begin retrieving the requested file immediately without waiting for the first download thread 544a to confirm that it has recognized the existence of the second download thread 544b.

Once the song request #2 has been fully retrieved, it is stored until song request #1 has been played and song request #2 reaches the top of the performance queue table 560. The audio control module 316 then receives the song request #2 audio file and begins playing it for the consumer. In some embodiments, the content manager 540 may also retrieve any associated entertainment content, such as album cover art and/or artist information, and transmit those files to be performed by the appropriate output system, e.g., display control module 314.

After the download thread 544b has completed the retrieval of song request #2, the content manager 540 may initiate a new download thread 544c (not shown), which will resume the retrieval of the album X, track 3 audio file. Because the download progress prior to the interrupt had been stored, the download thread 544c may resume downloading precisely where the download thread 544a left off. After all of the tracks and other corresponding files for Album X are downloaded from the host system 100 and listed on the local content table 572, this album may be presented to consumers as being an album locally available to be requested by the consumer.

In some embodiments, the entertainment content file that is downloaded upon user request is stored temporarily in cache until the entertainment content is performed. After performance, the entertainment content file may be deleted from the cache. In other embodiments, it may be desirable to store the entertainment content file locally in the local content file system 330 so that if the same entertainment content file is requested by another consumer in the future, the entertainment device 110 need not download the entertainment content file again.

In some embodiments, a particular venue may have multiple entertainment devices sharing a single router and a single network connection. In this case, it may be desirable for the content retrieval modules in each of the entertainment devices to communicate with each other to determine prioritizations. For example, when a first device has a file queued for download, it will first transmit a message to the second device to determine whether the network connection is available. If the network connection is available, the first device can begin downloading immediately. If the second device is currently downloading another file, the first and second devices may perform an arbitration to determine which file has the higher priority. The lower priority file will be suspended and the higher priority file will be downloaded immediately. In another embodiment, one of the entertainment devices may act as a master device, maintaining a single content request table for all devices sharing the network connection. The master device will perform arbitrations and prioritize the download requests from all of the slave devices.

In accordance with various embodiments of the present invention, a prioritized content download mechanism is provided for entertainment devices. These entertainment devices may be configured to retrieve both managed content and consumer-requested content from a host system. The managed content may comprise, e.g., new entertainment content selected by the operator to be added to the locally-stored catalog of entertainment content, operational software files, and advertising content. The consumer-requested content may comprise, e.g., consumer requests for non-locally-stored entertainment content to be performed by the entertainment device. Various embodiments may enable the devices to access managed content 24 hours a day, rather than only during restricted periods of time during which consumer on-demand usage is low. This can enable efficient usage of the network connection while maintaining consumer satisfaction in accessing on-demand content. This also enables entertainment device operators and host system administrators to distribute very large amounts of new software and content to entertainment devices without adversely affecting the consumer experience. In addition, it can avoid the necessity of taking the entertainment device out of operation to dedicate a certain period of time for managed content updates.

In some embodiments, the status of any pending downloads that are interrupted in favor of higher priority downloads is maintained. This way, when all consumer-driven requests have been serviced, the entertainment device can resume the download of the managed content where it left off.

While the invention has been described in terms of particular embodiments and illustrative figures, those of ordinary skill in the art will recognize that the invention is not limited to the embodiments or figures described. For example, in many of the embodiments described above, the entertainment content in the local content handler 520 is requested by the jukebox operator on an album level. In other words, the operator selects an entire album of songs to be downloaded onto the jukebox. This may be a requirement imposed by the music publisher, or may be for consumer convenience. However, it will be understood that the same retrieval mechanisms may be utilized on the individual file level (e.g., an operator may request that a single song be retrieved by the jukebox to be locally stored), or may be organized in other ways (e.g., requesting the downloading of all song files by a particular artist or of a particular genre, such as rap, country, or pop).

In addition, in the embodiments described above, if the content manager 540 is already retrieving another file, the newly requested file is placed in a queue to be downloaded when all previously requested files have been retrieved. Only consumer-requested files are given a higher priority than the other files. In other embodiments, multiple priority levels may be provided and implemented by the content manager 540.

For example, the content manager 540 may have a hierarchy of priorities such that consumer-requested files are at the highest priority, followed by essential software files, new music selections entered by the operator into the host system 100, advertising content (e.g., video attract loops that may play on the entertainment device to attract consumers when no other consumer requested entertainment content is playing, or video commercial advertisements for third party companies), and finally non-essential software files. This can help to ensure efficient downloading of the various files used by the entertainment device. For instance, on one day, a jukebox operator may decide to order 50 new albums to be downloaded to the jukebox. If a critical software update was released just after this new album order, the jukebox may take an extremely long time to complete the downloading of all of the new albums before retrieving the software file. Accordingly, it may be desirable to prioritize the essential software file so that an album order by the operator will not delay the downloading of the software file. Because the primary purpose of the entertainment device is to provide entertainment services to consumers, typically in exchange for some form of payment, and consumers generally expect that the requested services be promptly performed, it may be still be desirable for consumer-requested entertainment content be prioritized above the unscheduled software files and the operator-initiated updates to the local content catalog, since neither of those types of downloads are as time critical as user requests. It will be understood that different prioritization schemes may be implemented, depending on the desired urgency.

The jukeboxes described above include a user interface and user input devices to enable consumers to select songs or videos to be performed on the jukebox. In other embodiments, the entertainment devices may not receive consumer inputs. These entertainment devices may be, for example, advertising kiosks which may be used to perform advertising audio and video. It may be desirable to implement prioritized content downloads in order to manage and prioritize the downloading of new advertisements and operational files to the kiosks.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

Some portions of the detailed description are presented in terms of procedures, steps, logic blocks, processing, and other symbolic representations of operations on data bits that can be performed on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

The described entertainment devices and prioritized content mechanisms may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium such as, for example, magnetic storage medium (e.g. hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

We claim:

1. An entertainment system, comprising:
a storage device for storing files;
a network interface for coupling the entertainment system with a host system over a network; and
a content retrieval module for managing file download requests to the host system, wherein if the content retrieval module receives a request to retrieve a file having a scheduled performance and not stored on the storage device, the content retrieval module causing the scheduled performance file from the host system to be retrieved with a higher priority than retrievals of unscheduled files already in progress, wherein the content retrieval module is configured to record an interruption location for the unscheduled file, and after the downloading of the scheduled performance file is completed, resume downloading the unscheduled file at the interruption location for the unscheduled file, and wherein the content retrieval module is configured to determine a highest interrupt priority among a plurality of scheduled performance files and the interrupt priority for each of the scheduled performance files is based on a function of revenue associated with each of the scheduled performance files.

2. The system of claim 1, further comprising: a user interface module for receiving entertainment content requests from a user.

3. The system of claim 2, further comprising: a payment interface for receiving payment by a consumer in exchange for allowing the consumer to request performance of entertainment content.

4. The system of claim 1, wherein: the content retrieval module is configured such that if the content retrieval module receives the request to retrieve the scheduled performance file, the content retrieval module will interrupt a pending download of an unscheduled file and begin downloading the scheduled performance file.

5. The system of claim 4, wherein the content retrieval module is configured to determine a highest interrupt priority among a plurality of unscheduled files.

6. The system of claim 4, wherein: the unscheduled file comprises an operational file.

7. The system of claim 1, further comprising: an audio control module for playing audio-based entertainment content.

8. The system of claim 1, further comprising: a video control module for playing video-based entertainment content.

9. The system of claim 1, further comprising: a gaming module for executing video game entertainment content.

10. The system of claim 1, further comprising: a download queue for storing files to be downloaded; wherein in response to receiving requests to retrieve unscheduled files, the content retrieval module is configured to prioritize the unscheduled files in the download queue.

11. The system of claim 10, wherein: the content retrieval module is configured to retrieve software files with a higher priority than unscheduled entertainment content files.

12. The system of claim 1, wherein: the scheduled performance file comprises an advertising file.

13. The system of claim 1, wherein: the scheduled performance file comprises an audio file or a video file.

14. The system of claim 1, wherein: the content retrieval module is configured to retrieve an advertising file with a scheduled performance with a higher priority than an entertainment content file having a scheduled performance.

15. The system of claim 1, wherein: the content retrieval module is configured to communicate with a second entertainment system sharing a network connection with the network interface to prioritize file downloading by the content retrieval module and the second entertainment system.

* * * * *